US006950402B2

United States Patent
Mishra (10) Patent No.: US 6,950,402 B2
(45) Date of Patent: Sep. 27, 2005

(54) WEB-ENABLED CALL MANAGEMENT METHOD AND APPARATUS

(75) Inventor: Om Mishra, San Jose, CA (US)

(73) Assignee: Persona Software, Inc., Santa Clara, CA (US)

( * ) Notice: Subject to any disclaimer, the term of this patent is extended or adjusted under 35 U.S.C. 154(b) by 720 days.

(21) Appl. No.: 09/784,643

(22) Filed: Feb. 15, 2001

(65) Prior Publication Data

US 2002/0110121 A1 Aug. 15, 2002

(51) Int. Cl.$^7$ .............................................. H04L 12/56
(52) U.S. Cl. ...................................................... 370/252
(58) Field of Search .......................... 379/93.01, 93.09, 379/93.11, 93.17, 142.16, 142.17; 370/241, 252, 260, 261, 389

(56) References Cited

U.S. PATENT DOCUMENTS 5,689,641 A  * 11/1997 Ludwig et al. .............. 709/241
5,907,604 A  *  5/1999 Hsu ....................... 379/142.06
6,026,158 A  *  2/2000 Bayless et al. ........ 379/355.08

* cited by examiner

*Primary Examiner*—Chi Pham
*Assistant Examiner*—Derrick W Ferris
(74) *Attorney, Agent, or Firm*—Pillsbury Winthrop Shaw Pittman LLP; James Y. C. Sze (57) ABSTRACT

A web-enabled call-interface method and apparatus, capable of managing packet-based/Internet Protocol-based calls. The embodiments include a system, apparatus and method to manage calls through identifying the media type of an incoming or outgoing call, presenting call features associated with the media type to a subscriber, and receiving a call feature selection from the subscriber. When the call feature selected requires further input, the subscriber is prompted for the call feature input.

23 Claims, 7 Drawing Sheets

WEB-ENABLED CALL MANAGEMENT METHOD AND APPARATUS

BACKGROUND

1. Field of the Invention

Aspects of the present invention relate in general to packet-based telephony, specifically managing telephone or other media calls via a web-enabled call-interface.

2. Description of the Related Art

Ever since Alexander Graham Bell invented the first telephone, people have been using the telephone to communicate. With the advent of Intelligent Network (IN) and Next Generation Network (NGN) features, users now have the option of combining additional useful features with their phone service. At one estimate, from Bellcore spec # TR-NWT-000391, over 3,500 different calling features are contemplated. Of these 3,500 possible features, approximately 35 features are available from various phone companies. Often, features are implemented by adding specialized buttons to a telephone (e.g., a "hold" button for call holding), or by pressing a specialized button combination (e.g., pressing "*082" for call blocking).

Of the approximately 35 available features, only a small fraction is actually utilized by the public.

DETAILED DESCRIPTION

What is needed is an easy-to-use apparatus and method capable of managing calls and call features.

Aspects of the present invention include a web-enabled call-interface capable of managing packet-based/Internet Protocol-based calls, such as those calls received by an Internet Access Device (IAD) in conjunction with an Intelligent Network (IN) or Next Generation Network (NGN). The embodiments of the present invention include a system, apparatus and method to manage, originate and receive calls.

The term "call," as used herein, may refer to audio (e.g., telephone), video, text (e.g. "instant text messaging" services) and multimedia based messages, or any other packet-based message communication as is known in the art.

Calls are any real-time or near-real-time audio, video, text, and multimedia-based message transmissions that take place over a computer network (i.e., an "on-line" message transmission). Examples of such transmissions include, but are not limited to, any user-to-user or user-to-multi-user communication that involves the electronic conveying of digital-packet messages. An example of such a call includes a electronic text "chat" or "talk" messaging, electronic-mail, video-conferencing, internet telephony ("voice over internet protocol"), or instant text messaging.

Call features are any functions related to calls, as are known in the art. Such call features may include, but are not limited to: call conferencing, call rejection, placing calls on hold, call waiting, call forwarding, remote call forwarding, selective call forwarding, 3-way calling, speed dialing variations, calling number delivery, calling number block, private line, selective call rejection, selective call acceptance, distinctive ringing, customer originated trace, automatic call back, automatic recall, intercom (revert call), toll access restriction, call blocking, 900 blocking, rotary hunt group, vacation service, voice mail, and many other functions.

Figure 1:
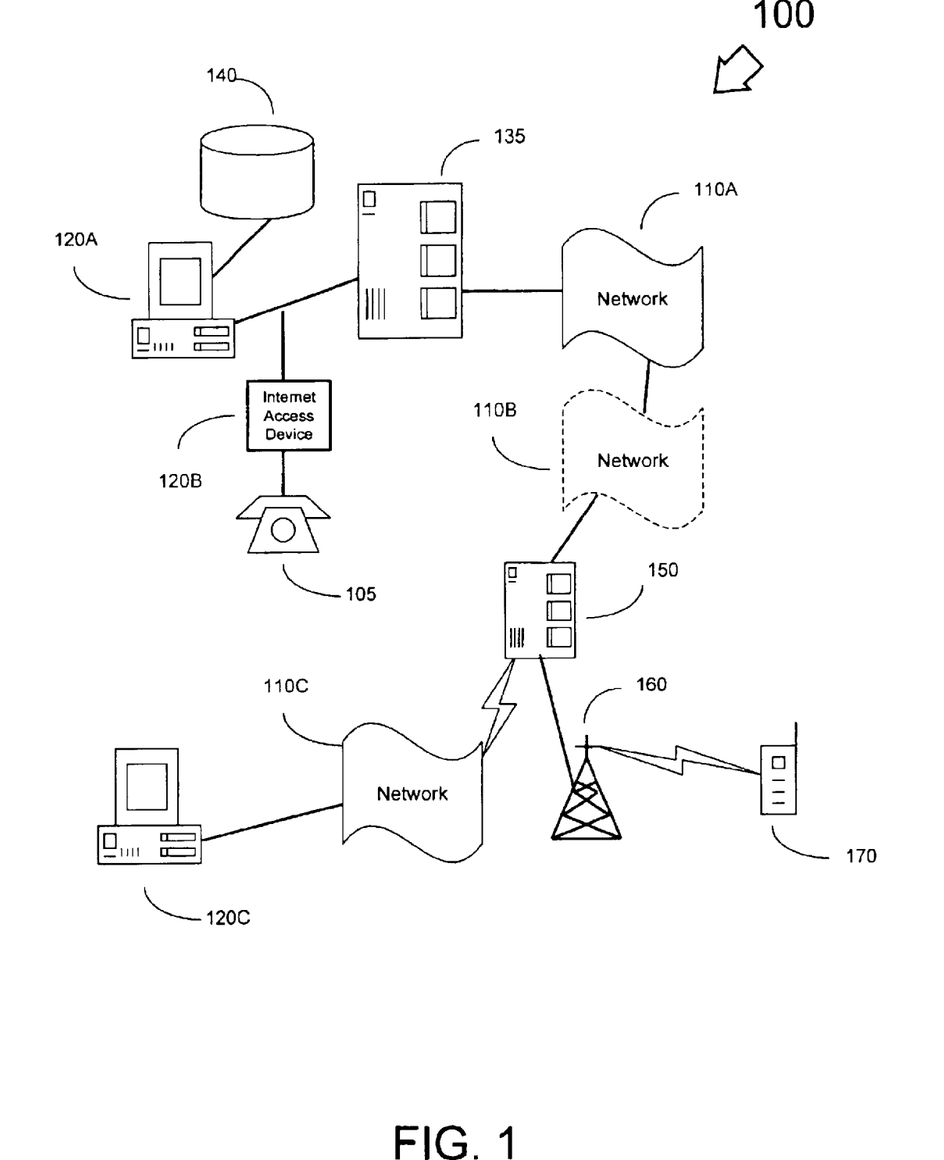
FIG. 1 illustrates an embodiment of a system that facilitates telephony management via a web-enabled call-interface.

FIG. 1 is a simplified functional act diagram depicting system 100, constructed and operative in accordance with an embodiment of the present invention. System 100 is configured to facilitate telephony management via a web-enabled call-interface.

The method identifies the type of incoming or outgoing call and offers users a host of call features through a simple web-enabled caller interface.

In system 100, internet access devices 120 are connected via a communications network 110. Users may communicate to other users via internet access devices 120, telephones 105 coupled to internet access devices 120, or wireless phones 170. It is understood by those known in the art, that either such devices may be coupled via a single or multiple number of networks 110A–C.

In some embodiments, internet access device 120 may be a personal computer, personal digital assistant (PDA), wireless phone, or other such network-computing device.

The network 110 may also include other networkable devices known in the art, such as other internet access devices 120, storage media 140, an application server 135, telephone server 150 and wireless telephone base station 160. It is well understood in the art, that any number or variety of computer networkable devices or components may be coupled to the network 110 without inventive faculty. Examples of other devices include, but are not limited to, servers, computers, workstations, terminals, input devices, output devices, printers, plotters, routers, bridges, cameras, sensors, or any other such device known in the art.

Internet access device 120 may be any apparatus known in the art that are able to communicate on the network 110.

Network 110 may be any communication network known in the art, including the Internet, a local-area-network (LAN), a wide-area-network (WAN), or any system that links a computer to an internet access device 120. Further, network 110 may be of configured in accordance with any topology known in the art, including star, ring, bus, or any combination thereof.

Application server 135 is connected to a telephone network 110A that supports the receipt and transmission of digital packets. Telephone network server 150 may be configured to allow different networks 110B and 110C to communicate, as well as communicate with a packet switch telephone network (PSTN), plain ordinary telephone service (POTS), Integrated Services Digital Network (ISDN), or any other telephone network. As shown in FIG. 1, telephone network server 150 may be coupled to wireless base station 160, which allows communication to wireless phone 170.

Figure 2:
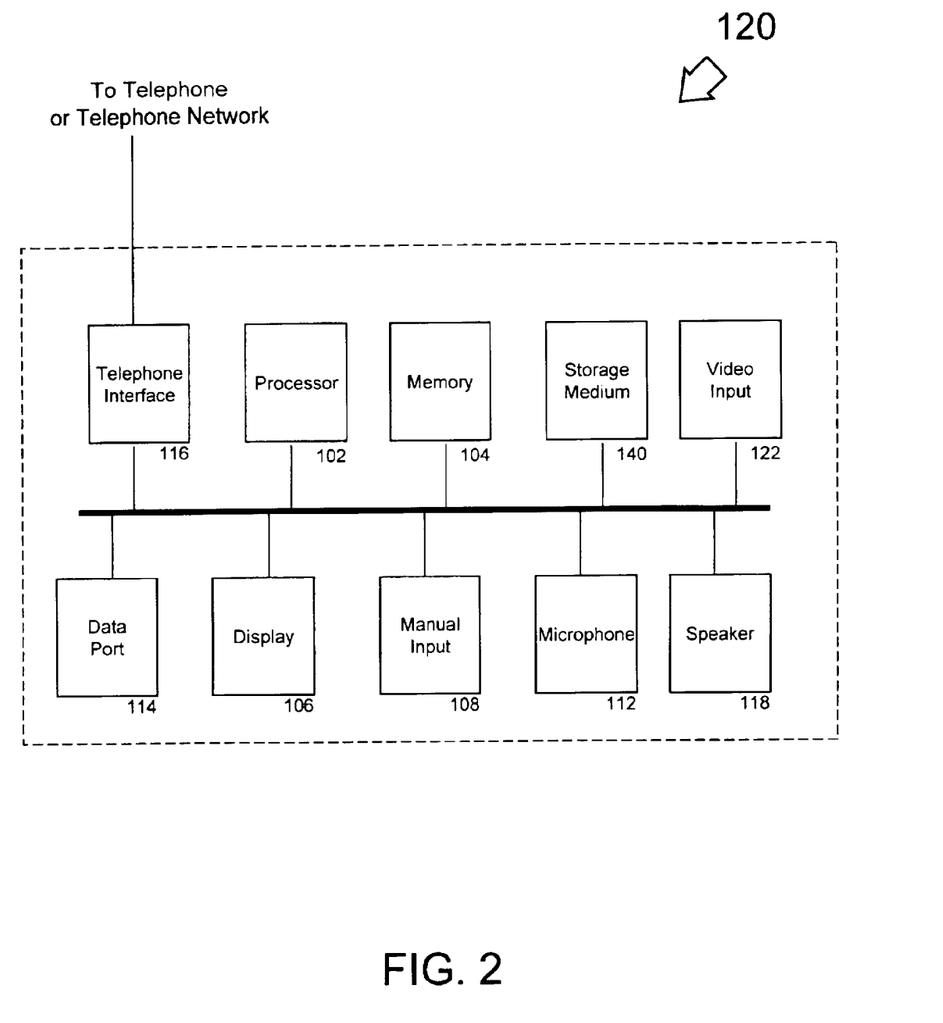
FIG. 2 is a act diagram of an apparatus that facilitates telephony management via a web-enabled call-interface.

Embodiments will now be disclosed with reference to a functional act diagram of an exemplary internet access device 120 of FIG. 2, constructed and operative in accordance with an embodiment of the present invention. Internet access device 120 runs a multi-tasking operating system and includes at least one processor or central processing unit (CPU) 102. Processor 102 may be any microprocessor or micro-controller as is known in the art.

The software for programming the processor 102 may be found at a computer-readable storage medium 140 or, alternatively, from another location across network 110. Processor 102 is connected to computer memory 104. Internet access device 120 may be controlled by an operating system (OS) that is executed within computer memory 104.

Processor 102 communicates with a plurality of peripheral equipment, including telephone interface 116. Additional peripheral equipment may include a display 106, manual input device 108, storage medium 140, microphone 112, video input 122, and data port 114.

Display 106 may be a visual display such as a cathode ray tube (CRT) monitor, a liquid crystal display (LCD) screen, touch-sensitive screen, or other monitors as are known in the art for visually displaying images and text to a user.

Manual input device 108 may be a conventional keyboard, keypad, mouse, trackball, or other input device as is known in the art for the manual input of data.

Storage medium 140 may be a conventional read/write memory such as a magnetic disk drive, floppy disk drive, compact-disk read-only-memory (CD-ROM) drive, transistor-based memory or other computer-readable memory device as is known in the art for storing and retrieving data. Significantly, storage medium 140 may be remotely located from processor 102, and be connected to processor 102 via a network 110 such as a local area network (LAN), a wide area network (WAN), or the Internet.

Microphone 112 may be any suitable microphone as is known in the art for providing audio signals to processor 102. In addition, a speaker 118 may be attached for reproducing audio signals from processor 102. Video input 122 may be a digital or analog video camera device to record still or moving images. In some embodiments, video input 122 may be a scanner device. It is understood that microphone 112, speaker 118, and video input 122 may include appropriate digital-to-analog and analog-to-digital conversion circuitry as appropriate.

Data port 114 may be any data port as is known in the art for interfacing with an external accessory using a data protocol such as RS-232, Universal Serial Bus (USB), or Institute of Electrical and Electronics Engineers (IEEE) Standard No. 1394 ('Firewire'). In some embodiments, data port 114 may be any interface as known in the art for communicating or transferring files across a computer network, examples of such networks include Transmission Control Protocol/Internet Protocol (TCP/IP), Ethernet, Fiber Distributed Data Interface (FDDI), token bus, or token ring networks. In addition, on some systems, data port 114 may consist of a modem connected to telephone interface 112. Similarly, telephone interface 112 provides connectivity to internet access device 120 to communicate with a telephone network 150. Thus, the telephone network interface 112 allows the internet access device 120 to communicate and process input and output from a telephone line.

Figure 3:
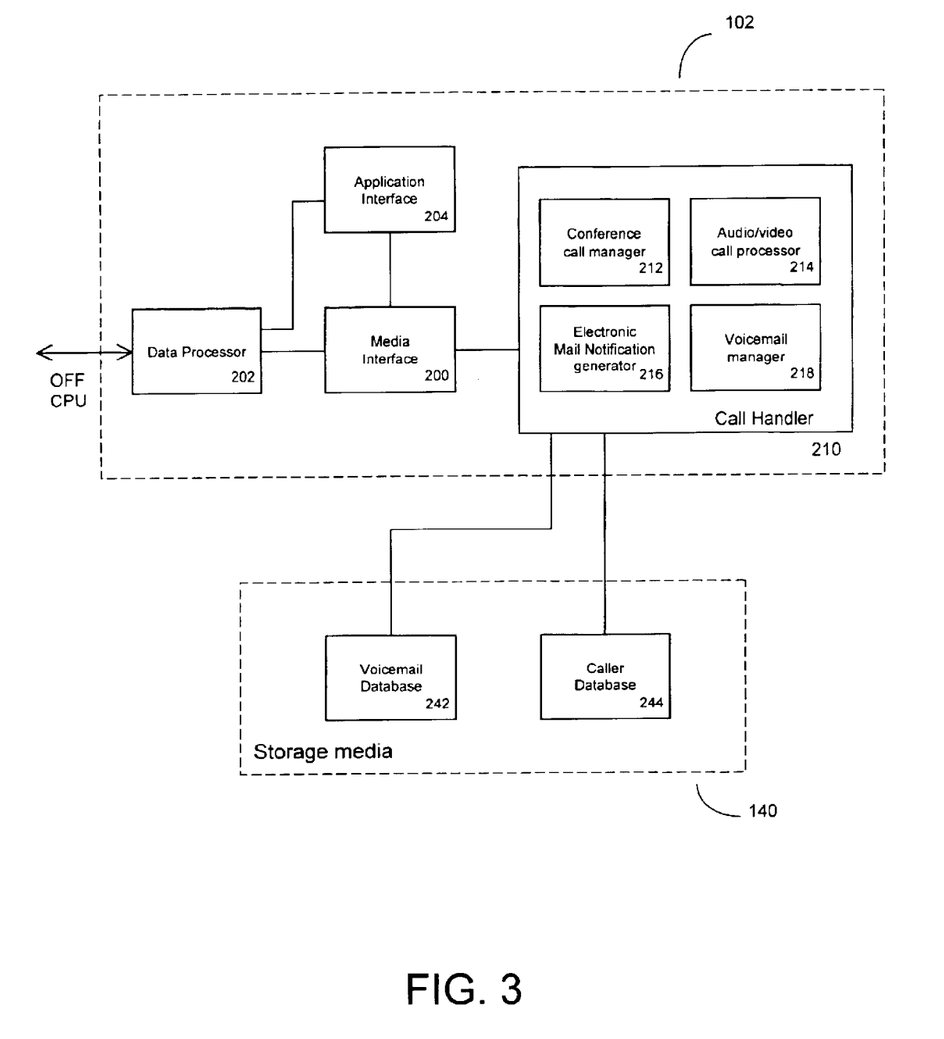
FIG. 3 is a diagram of a web-enabled telephony management call-interface.

FIG. 3 is an expanded functional act diagram of CPU 102 and storage medium 140. It is well understood by those in the art, that the functional elements of FIG. 3 may be implemented in hardware, firmware, or as software instructions and data encoded on a computer-readable storage medium 140. As shown in FIG. 3, central processing unit 102 is functionally comprised of a data processor 202, an application interface 204, a media interface 200, and a call handler 210. These structures may be implemented as hardware, firmware, or software encoded on a computer readable medium, such as storage media 140. In addition, as shown in FIG. 3, storage media 140 may also contain a voice mail database 242, and a caller database 244.

Data processor 202 interfaces with display 106, manual input device 108, storage medium 140, microphone 112, data port 114, video input 122, Internet data port 114, and telephone network interface 112. The data processor 202 enables processor 102 to locate data on, read data from, and write data to, these components.

Application interface 204 enables processor 102 to take some action with respect to a separate software application or entity. For example, application interface 204 may take the form of a windowing user interface, as is commonly known in the art.

Media interface 200 is a web-enabled call interface. In some embodiments, the media interface 200 may be stand-alone program, or a web-browser window. An example of such a web browser window is shown in FIG. 3. Web browser window 200 comprises title bar 401, window control buttons 402A–C, menu bar 404, button bar 406, address bar 408, phone-list frame 410, main frame 420, status frame 412, and control frame 414.

In some embodiments, main frame 420 displays a picture of the current caller retrieved from a caller database 244. In such embodiments, using the mouse pointer 418, users may either click control buttons 416A–E, or "drag-and-drop" callers listed in the phone list frame 410, or pictures of the caller in the main frame 420 to control buttons 416A–E in the control frame 414. Media interface 200 then selects the appropriate structure to execute the functionality specified by the control button 416.

Returning to FIG. 3, call handler 210 may further comprise a conference call manager 212, an audio/video call processor 214, an electronic mail notification generator 216, and a voice mail manager 218. Conference call manager 212 allows media interface to 200 communicate with multiple parties in a conference call. Audio/video call processor allows media interface to utilize video input 122, microphone 122, speaker 118 and display 106 for audio or multimedia-video-based calls. Electronic mail notification generator 216 allows media interface to communicate through text-based messaging systems, such as electronic mail or, in some embodiments, instant-messaging programs. Voice mail manager 218 communicates with media interface 200 and stores messages in a voice mail database 242. These components of call handler 210 interact with a voice mail database 242, and a known caller database 244, and may best be understood with respect to the flowcharts of FIGS. 5A–5C, as described below.

Figure 5A:
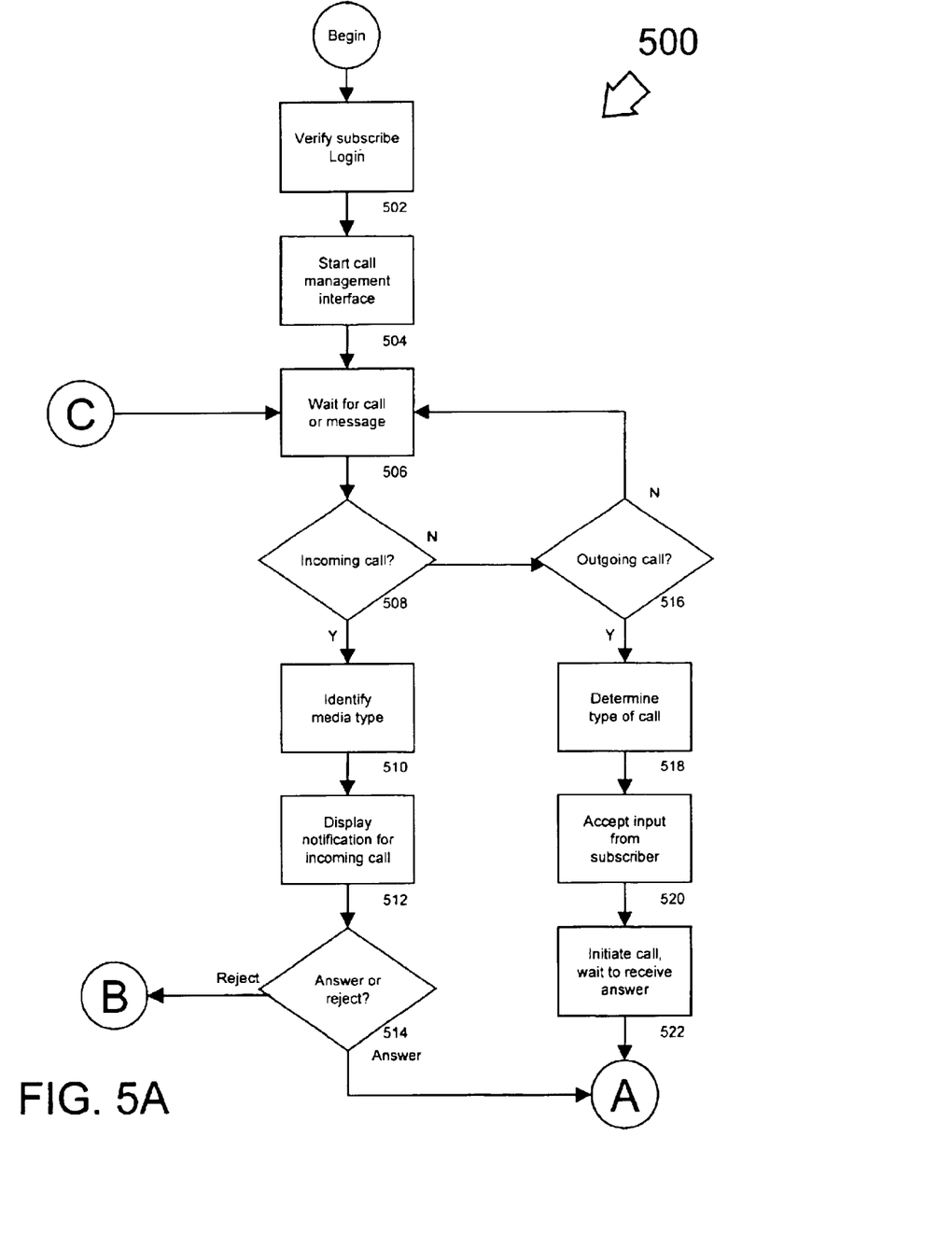
FIGS. 5A–5C are flowcharts of a method that facilitates telephony management via a web-enabled call-interface.
Figure 5B:
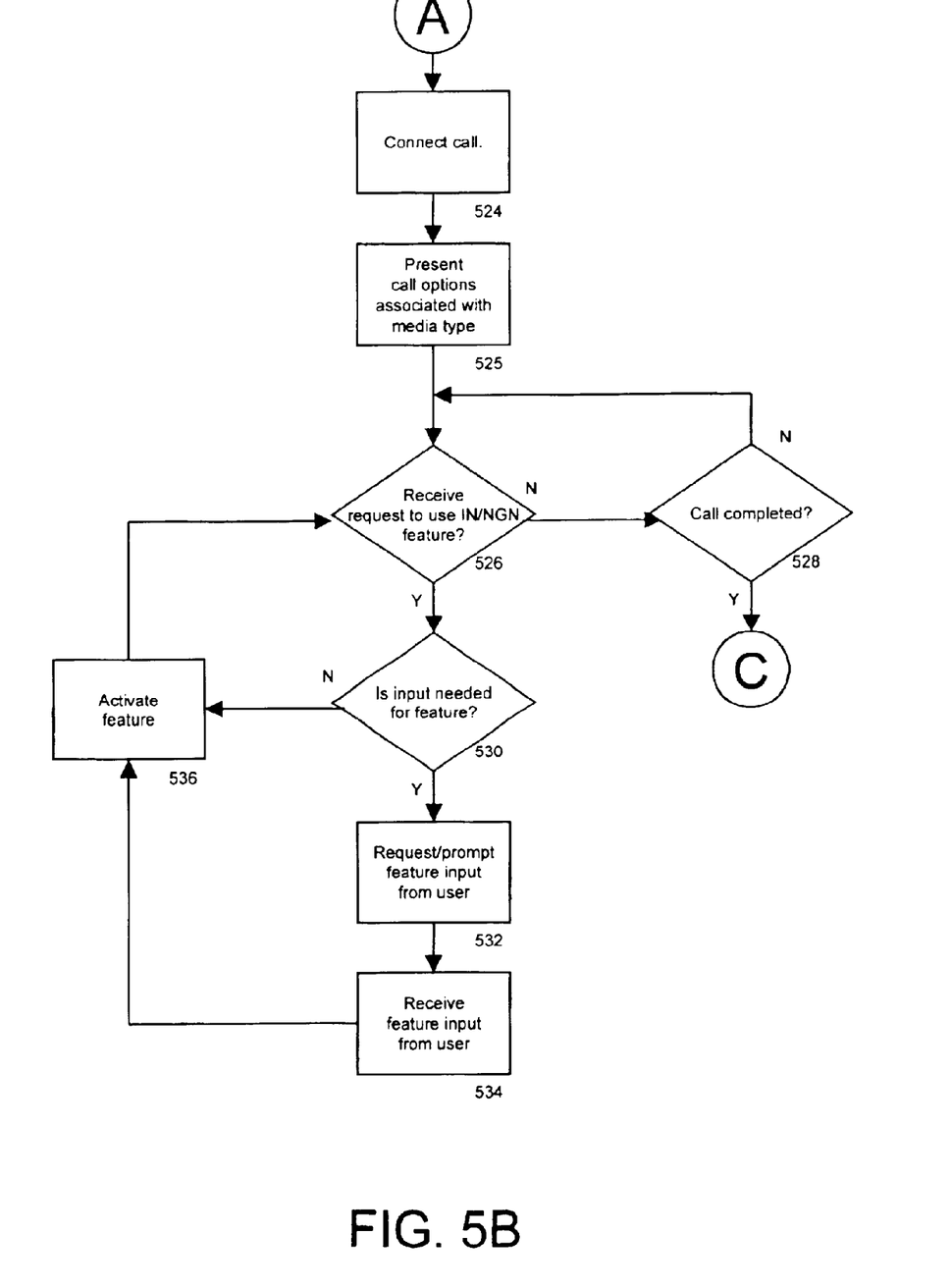
Figure 5C:
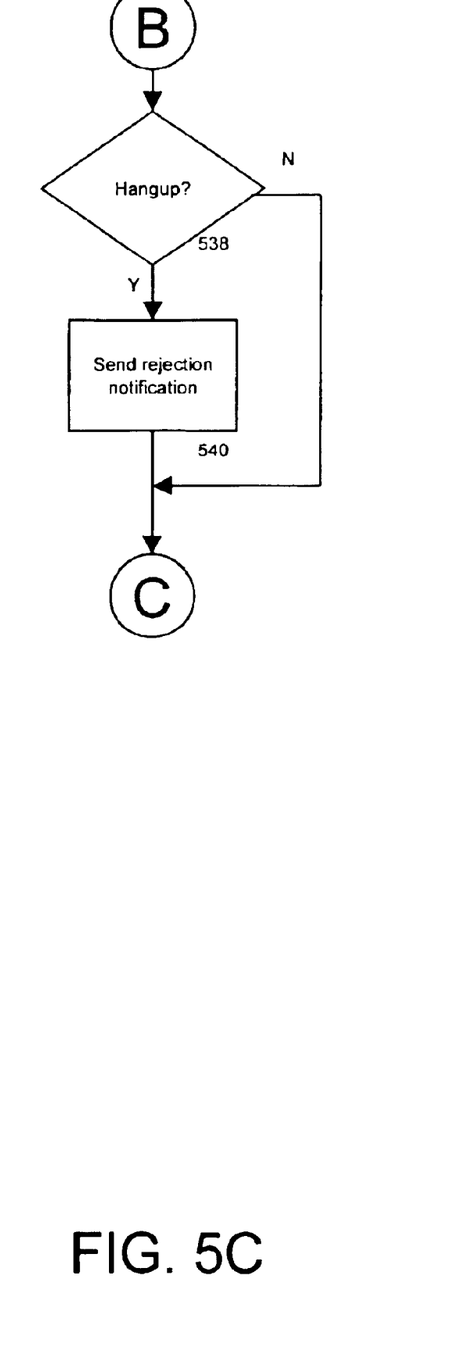

FIGS. 5A–5C flowcharts a process 500 to manage calls via a web-interface, constructed and operative in accordance with an embodiment of the present invention.

At act 502, a login subset of media interface 200 communicates with call handler 210 to verify the user/subscriber login into the system 502. In some embodiments, this act is accomplished by having call handler 210 check a login password, voice-print, or other verification identifier known in the art, with a stored value in the caller database 244. For security purposes, this verification identifier value may be encrypted within a caller database 244 field or schema.

In other embodiments, the verification of the subscriber login is accomplished when the subscriber logs into the application interface 204 program. In such an embodiment, it is assumed that the subscriber and the application interface 204 user are the same person.

Figure 4:
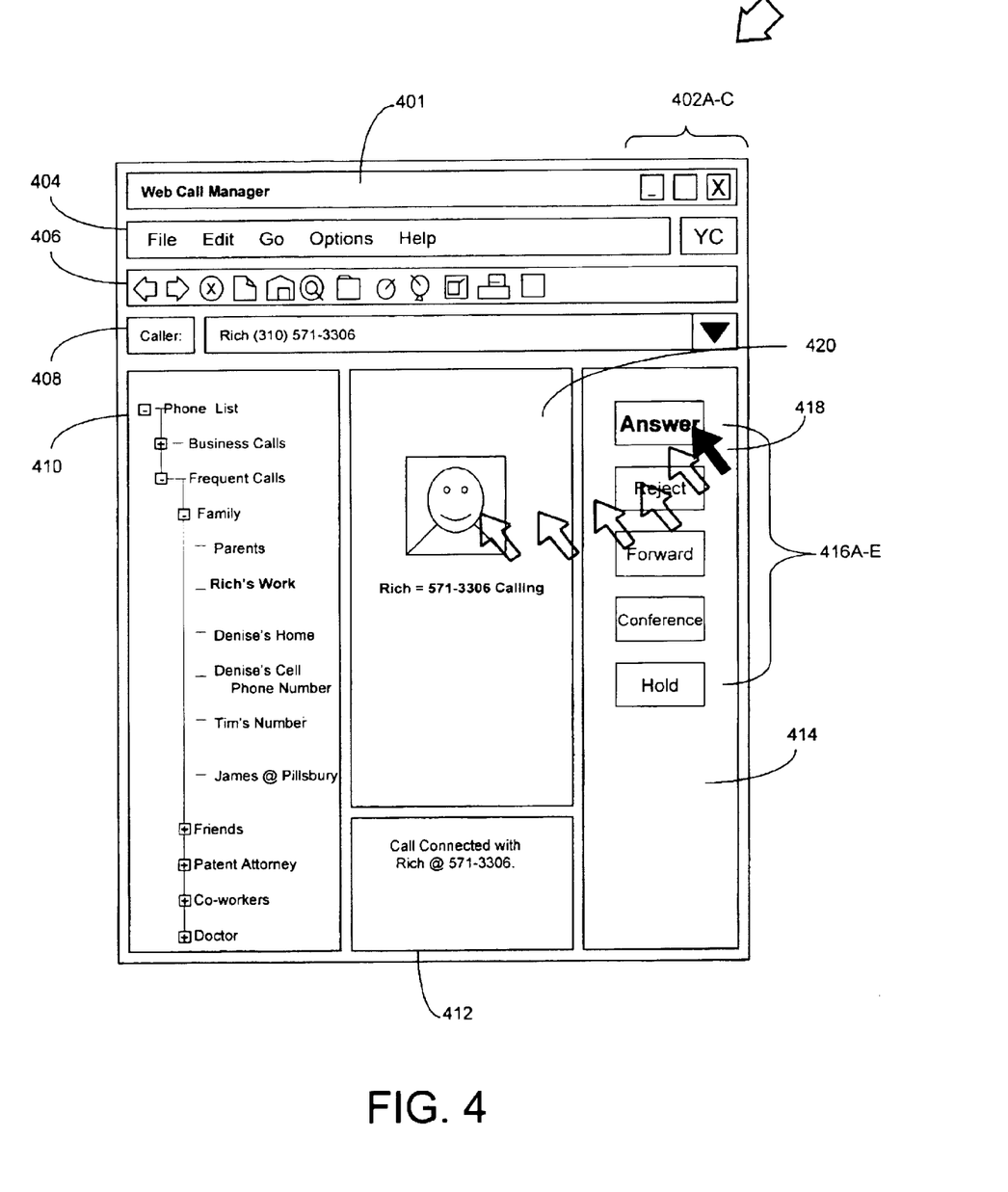
FIG. 4 is a act diagram of an apparatus that facilitates telephony management via a web-enabled call-interface.

Once the user/subscriber has been verified, the full media interface 200 is started at act 504. As discussed above with FIG. 4, the media interface 200 may be a web-enabled interface at which a subscriber using internet access device 120 may navigate a call management interface via application server 135.

At act 506, the media interface 200 awaits for an outside event by the subscriber or the system 100. The outside event may be an incoming call or message, or an outgoing call/message initiated by the subscriber.

When the outside act occurs, call handler 210 determines whether the event is an incoming call at act 508. If the outside act is an incoming call, the process flow continues at act 510. Otherwise, the flow continues at act 516.

If the outside act is an incoming call, the media type of the incoming call is determined, act 510. In some embodiments, parsing the packets that comprise the call can identify the incoming call media type. As discussed above, the media type of a call includes voice, instant text messaging, multimedia (voice and image), and conferencing versions thereof. Media interface 200 is designed to be flexible enough to accommodate a wide variety of incoming call types. Once the media type is identified, the subscriber receives a notification for the incoming call, act 512. The notification may include information about the call type, call source, or any other information related to the incoming call. For example, if the call is a request for a text messaging "chat," voice or video call, the notification may include caller identification ("caller ID"), call originator user ID, or other information related to the call source. If the caller information is available, process 500 may display a picture or photograph of the caller in main frame 420 as part of the notification. Furthermore, the notification may be a ringing or other sound effect output by speaker 118, a pop-up window notification on display 106, flashing by display 106, vibration, or other sound, visual, or motion notification or combination thereof. Subscriber is then given the option to answer or reject the incoming call at act 114. If the subscriber decides to answer the call, flow continues at act 524 on FIG. 5B. If the subscriber refuses to answer the call (i.e. "rejects" the call), flow continues at act 538 on FIG. 5C.

If the outside act is not an incoming call, at act 516 call handler 210 determines whether the event is an outgoing call. If not, flow returns at act 506. Otherwise, if the event is an outgoing call, flow continues. At act 518, process 500 determines the type of call being initiated. In some embodiments, the media type of the outgoing call is determined by querying the subscriber, and accepting input on call options from the subscriber at act 520. At act 522, call handler 210 initiates the call and waits to receive an answer. The process flow then continues at act 524 on FIG. 5B.

Moving to FIG. 5B, at act 524, when the answering party receives the call, the call is connected by the call handler 210. When the call handler 210 connects the call, media interface 200 displays the Intelligent Network (IN), Next Generation Network (NGN) feature, or other call feature available for the specific call type, act 525. In some embodiments, the features available are shown in control frame 414 as control buttons 416.

Input may then be received from the subscriber by the media interface 200.

Call handler 210 determines whether the input received by the subscriber is a request to use an Intelligent Network (IN), Next Generation Network (NGN) feature, or other call feature known in the art, at act 526.

If the received request was not to use a feature, as determined by act 526, flow continues to act 528. At decision act 528, call handler 210 determines whether the call is completed. If the call is completed, flow returns to act 506. If the call is not complete, flow returns to act 526.

If the received request was to use a feature, as determined by act 526, flow continues at act 530.

At decision act 530, if subscriber input is not needed, flow continues to act 536.

If subscriber input is needed, as determined by act 530, flow continues to act 532. The feature input information is requested from the subscriber by media interface 200, act 532. Once feature input is received from the user/subscriber, act 534, flow continues at act 536.

The selected feature is activated by call handler 210 at act 536, and flow returns to 526.

Moving to FIG. 5C, phone rejections are handled. At act 538, a determination is made on whether the subscriber is hanging-up on the caller. If not (i.e., the subscriber is taking no action to receive the incoming call), flow returns to act 506. If the subscriber is "hanging up" on the caller (i.e. purposely deciding not to answer), a rejection notification is sent to the caller, at act 540. The rejection notification may be of any form known in the art, such as an e-mail or text message notification, voicemail notification, or other notification. Flow then continues at act 506.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. An apparatus comprising:
   a call handler configured to identify a media type of a call;
   a media interface, coupled to the call handler, configured to present at least one call feature selection associate with the media call type, configured to determine whether the call feature selection requires additional information, and configured to prompt the subscriber for the additional information when required by the call feature selection;
   a call processor configured to facilitate audio or video calls through the media interface;
   a conference call manager configured to facilitate calls to multiple parties;
   a voice mail database configured to store call messages;
   a voice mail manager, coupled to the voice mail database, configured to interface the voice mail database with the media interface; and
   an electronic mail notification generator configured to send a rejection notification to a call originator when the call is rejected through the media interface.

2. The apparatus of claim 1, wherein the media interface is further configured to accept the additional information from the subscriber.

3. The apparatus of claim 2, wherein the media interface is further configured to activate the call feature selection.

4. The apparatus of claim 3, wherein the call handler is further configured to receive the call and determine a call originator of the call.

5. The apparatus of claim 4, wherein the media interface is further configured to searching a caller database for a record matching the call originator, the record containing a picture of the call originator, and display the picture of the call originator when the matching record is found.

6. The apparatus of claim 5, wherein rejecting the call is one of the call features available for selection.

7. A method comprising:

identifying a media type of a call;

presenting at least one call feature selection associated with the media call type to a subscriber;

determining whether the call feature selection requires additional information;

prompting the subscriber for the additional information when required by the call feature selection;

facilitating audio or video calls through a media interface;

storing a message when the call is unanswered;

sending an electronic mail rejection notification to a call originator when the call is rejected through the media interface.

8. The method of claim 7, further comprising:

accepting the additional information from the subscriber.

9. The method of claim 8, further comprising:

activating the call feature selection.

10. The method of claim 9, further comprising:

receiving the call;

determining a call originator of the call.

11. The method of claim 10, further comprising:

searching a caller database for a record matching the call originator, the record containing a picture of the call originator;

displaying the picture of the call originator when the matching record is found.

12. The method of claim 10, wherein rejecting the call is one of the call features available for selection.

13. The method of claim 12, further comprising:

sending the call originator a rejection notification when the call is rejected.

14. A computer-readable medium encoded with data and instructions, the data and instructions causing an apparatus executing the instructions to:

identify a media type of a call;

present at least one call feature selection associated with the media call type to a subscriber;

determine whether the call feature selection requires additional information;

prompt the subscriber for the additional information when required by the call feature selection;

facilitate audio or video calls through a media interface;

store a message when the call is unanswered;

send an electronic mail rejection notification to a call originator when the call is rejected through the media interface.

15. The computer-readable medium of claim 14 further encoded with data and instructions, causing an apparatus executing the instructions to:

accept the call feature selection from the subscriber.

16. The computer-readable medium of claim 15, further encoded with data and instructions, causing an apparatus executing the instructions to:

accept the additional information from the subscriber.

17. The computer-readable medium of claim 16, further encoded with data and instructions, causing an apparatus executing the instructions to:

the call feature selection.

18. The computer-readable medium of claim 17, further encoded with data and instructions, causing an apparatus executing the instructions to:

receive the call;

determine a call originator of the call.

19. The computer-readable medium of claim 18, further encoded with data and instructions, causing an apparatus executing the instructions to:

search a caller database for a record matching the call originator, the record containing a picture of the call originator;

display the picture of the call originator when the matching record is found.

20. The computer-readable medium of claim 18, wherein rejecting the call is one of the call features available for selection.

21. The computer-readable medium of claim 20, further encoded with data and instructions, comprising:

send the call originator a rejection notification when the call is rejected.

22. An apparatus comprising:

means for identifying a media type of a call;

means for presenting at least one call feature selection associated with the media call type to a subscriber;

means for determining whether the call feature selection requires additional information;

means for prompting the subscriber for the additional information when required by the call feature selection;

means for facilitating audio or video calls through the media interface;

means for facilitating calls to multiple parties;

means for storing call messages;

means for interfacing the voice mail database with the media interface; and means for sending an electronic mail rejection notification to a call originator when the call is rejected through the media interface.

23. The apparatus of claim 22, further comprising:

means for accepting the call feature selection from the subscriber.

* * * * *